United States Patent
Motos

(10) Patent No.: US 12,556,930 B2
(45) Date of Patent: *Feb. 17, 2026

(54) METHODS AND APPARATUS TO SYNCHRONIZE DEVICES

(71) Applicant: Texas Instruments Incorporated, Dallas, TX (US)

(72) Inventor: Tomas Motos, Hamar (NO)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 73 days.

This patent is subject to a terminal disclaimer.

(21) Appl. No.: 18/529,105

(22) Filed: Dec. 5, 2023

(65) Prior Publication Data

US 2024/0121614 A1 Apr. 11, 2024

Related U.S. Application Data

(63) Continuation of application No. 17/308,761, filed on May 5, 2021, now Pat. No. 11,863,992.

(51) Int. Cl.
*H04W 12/50* (2021.01)
*H04L 9/06* (2006.01)
(Continued)

(52) U.S. Cl.
CPC ........... *H04W 12/50* (2021.01); *H04L 9/0618* (2013.01); *H04W 4/80* (2018.02); *H04W 56/001* (2013.01); *H04W 84/12* (2013.01)

(58) Field of Classification Search
CPC ..... H04W 12/50; H04W 4/80; H04W 56/001; H04W 84/12; H04W 12/069; H04W 84/18; H04L 9/0618; H04L 9/001; H04L 9/12
See application file for complete search history.

(56) References Cited

U.S. PATENT DOCUMENTS 8,599,824 B2 12/2013 Walley
2009/0017839 A1* 1/2009 Kim ............... H04W 12/088
455/456.1

(Continued)

FOREIGN PATENT DOCUMENTS

WO 2007043014 A1 4/2007

OTHER PUBLICATIONS

"Specification of the Bluetooth System", Specification vol. 0, Master Table of Contents & Compliance Requirements, Bluetooth Specification Version 4.2 [vol. 0], 2772 pgs, Dec. 2, 2014.

(Continued)

*Primary Examiner* — Mohammad W Reza
(74) *Attorney, Agent, or Firm* — Michelle F. Murray; Frank D. Cimino

(57) ABSTRACT

Sequences to synchronize devices and related methods are disclosed herein including an access address generator to cryptographically generate a first bit sequence, an access address selector to read a first portion of the first bit sequence and read a second portion of the first bit sequence, the second portion different than the first portion, an access address analyzer to identify a first access address from a first section of the first portion based on a first criteria, the first criteria a function of a first autocorrelation function and identify a second access address from a second section of the second portion based on a second criteria, the second criteria a function of a second autocorrelation function.

21 Claims, 5 Drawing Sheets

(51) Int. Cl.
   *H04W 4/80*    (2018.01)
   *H04W 56/00*   (2009.01)
   *H04W 84/12*   (2009.01)

(56) References Cited

U.S. PATENT DOCUMENTS

| | | | |
|---|---|---|---|
| 2011/0021142 A1 | 1/2011 | Desai | |
| 2016/0095079 A1* | 3/2016 | Monajemi | H04W 60/06 370/338 |
| 2017/0201859 A1 | 7/2017 | Banerjea | |
| 2018/0006854 A1 | 1/2018 | Zhang | |
| 2018/0242364 A1* | 8/2018 | Park | H04W 24/08 |
| 2018/0292522 A1 | 10/2018 | Cavendish | |
| 2018/0330521 A1 | 11/2018 | Samples | |
| 2019/0335335 A1* | 10/2019 | Schlangen | H04W 16/06 |
| 2023/0232450 A1* | 7/2023 | Yang | H04W 72/50 370/329 |

OTHER PUBLICATIONS

"Bluetooth Core Specification", Bluetooth Specification, Revision v5.2, Core Specification Working Group, 3256 pgs, Dec. 31, 2019.

* cited by examiner

METHODS AND APPARATUS TO SYNCHRONIZE DEVICES

CROSS-REFERENCE TO RELATED APPLICATIONS

This application is a continuation of U.S. patent application Ser. No. 17/308,761, filed May 5, 2021, which application is hereby incorporated herein by reference.

FIELD OF THE DISCLOSURE

This disclosure relates generally to device synchronization and, more particularly, to methods and apparatus to synchronize devices.

BACKGROUND

Bluetooth technology is useful in short-range wireless communication and data exchange between devices. Bluetooth communication enables users to pair, or synchronize, mobile devices with other mobile or fixed devices as well as simultaneously use Wi-Fi on the devices.

Figure 1:
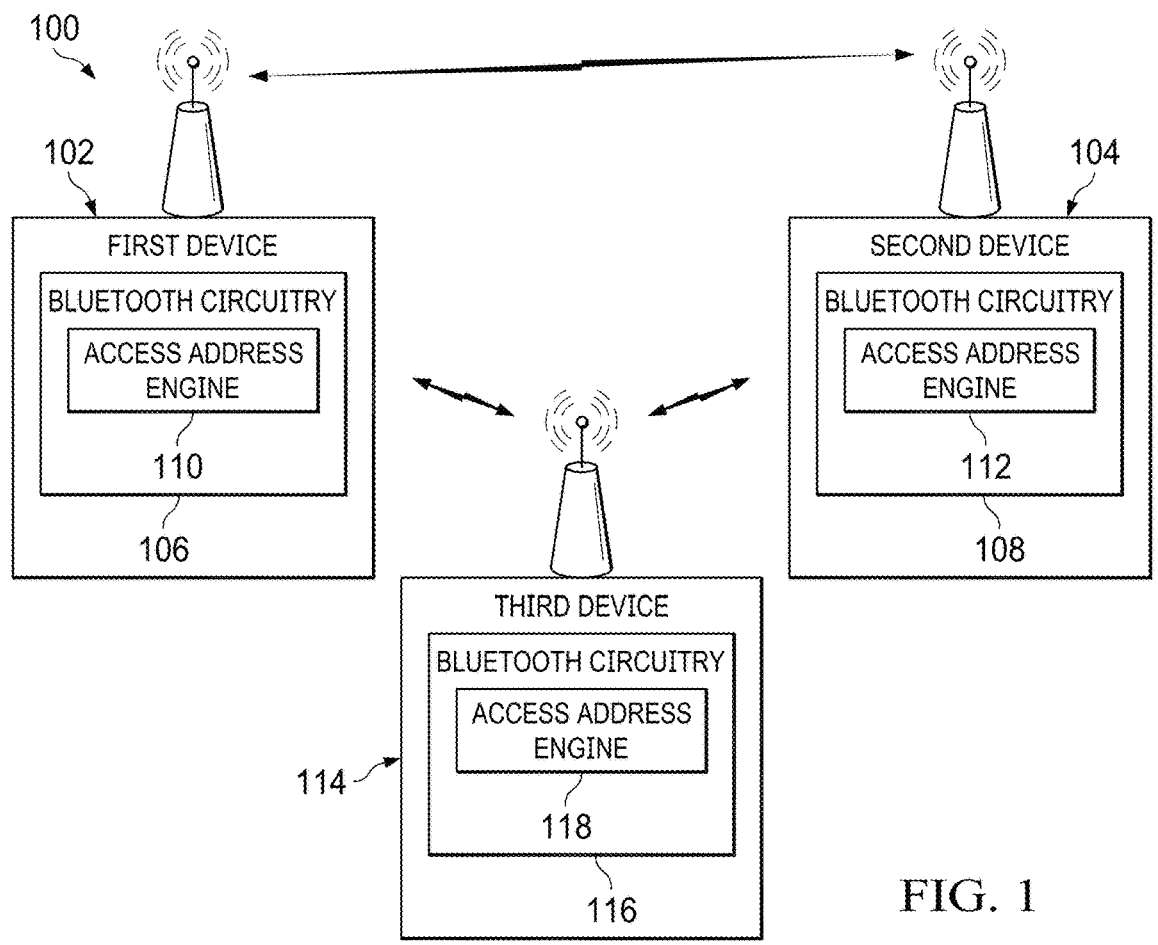
FIG. 1 is an example Bluetooth communication scheme between multiple devices.

The figures are not to scale. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Bluetooth technology is robust and useful technology for short-range communication and data exchange between wireless devices. Bluetooth communication enables users to pair, or synchronize, mobile devices with other mobile or fixed devices located within range. Range may vary, but is generally in the area of about 30 feet. Bluetooth communications are generally secure because Bluetooth-paired devices use Private Authentication Keys, or numbers (e.g., bit sequences) that are encrypted, randomly generated, and shared between the paired devices to encrypt connections. However, limitations exist that can reduce the security with which Bluetooth devices communicate.

Synchronization, or syncing, between two or more wireless Bluetooth devices can be facilitated by generating a list of similar (e.g., identical) synchronization bit sequences at each device. Such sequences can be generated or created simultaneously and independently at each device. However, to achieve secure synchronization, such sequences must satisfy a number of requirements to mitigate opportunities for hacking or unauthorized access. First, each sequence must by cryptographically generated, independently at both ends (e.g., at each individual device), based on a key shared between the two devices. In particular, the sequences are to be generated by a cryptographical algorithm, using a shared key. The use of the cryptographical algorithm can result in a pseudorandom noise (PRN) bit sequence. Such PN sequences can resemble noise as they appear as a random sequence but can be deterministically generated. It is understood that cryptographical generation of a random sequence (e.g., a PN bit sequence) does not impose any restrictions or limitations on the bit sequence.

The sequences are used as synchronization input for receivers. Furthermore, to avoid biasing various estimation circuitries of receivers, the content of the generated synchronization sequences must be balanced, specifically, in terms of the 0s (zeros) and 1s (ones) that make up the sequence. In the examples discussed herein, the devices (e.g., Bluetooth devices) generate and/or use a synchronization sequence that is 32 bits in length.

The generation of the sequence(s) must be deterministic in both the time in which they are generated and the bit content of the sequences. As such, when the two devices (e.g., Bluetooth devices) involved in the synchronization run the same procedures employing the shared key information, the resulting synchronization sequences must be similar (e.g., identical) under all circumstances and generated within the same period of time. As will be discussed in greater detail below, an Access Address is a bit sequence part of a longer synchronization sequence that is used between two or more devices to facilitate secure Bluetooth syncing and connection.

Currently, the use of random Access Addresses is known across Bluetooth Low Energy (BLE) specifications (e.g., BLE 4 and 5). In this scheme, a central device generates a synchronization sequence including an Access Address (AA) locally and verifies the usefulness of the generated AA for Bluetooth pairing with a set of rules (e.g., rules defined by Bluetooth specifications, etc.). Once verified, the central device sends the synchronization sequence including the AA to the second device in the pairing scheme to establish a Bluetooth connection. This approach is sufficient when a single AA is used for an entire pairing or connection scheme, however, not when multiple AAs are needed. For example, connection scenarios between devices may require a first AA during a first connection and a second AA during a second connection. In other examples, a first AA may be used to connect a first set of devices (e.g., a first and second device, etc.) and second AA may be used to connect a second set of devices (e.g., the first device and a third device, etc.). Synchronization sequence generation schemes that generate synchronization sequences (e.g., Access Addresses) that are (1) cryptographically generated, independently at both devices, from a shared key, (2) used as a synchronization input for a receiver, and (3) are similar (e.g., identical) under all circumstances are desirable. As such, a need exists for generating secured synchronization sequences at devices (e.g., Bluetooth devices) that are secure, can be used with receivers to enable synchronization, and similar (e.g., identical) in their outcome across situations.

The examples disclosed include an access address generator to generate an encrypted bit sequence to identify a set Access Addresses, or AAs, based on a set of applied rules. The examples disclosed herein apply to Bluetooth Low Energy version 6 and onwards.

FIG. 1 is an example Bluetooth communication scheme 100 between multiple devices connected via Bluetooth. In some examples, a first device 102 is connected to a second device 104. The first and second devices 102 and 104 can be any wireless devices capable of Bluetooth communication (e.g., a smart phone, a car, a speaker, a tablet, etc.). In some examples, the first and second device 102, 104 are the same type of device, whereas in other examples the first and second device 102, 104 are different types of devices. In some examples, the first and second devices 102, 104 can be stationary, or at least one of the first and second devices 102, 104 can be in motion. In some examples, the first and second devices 102, 104 are at a distance (e.g., 5 feet, 10 feet, 30 feet, etc.) away from each other that allows synchronization between the first and second device 102, 104.

As shown in FIG. 1, the first and second devices 102, 104 include a Bluetooth circuitry 106, 108 respectively, (e.g., an LMX9838 Bluetooth Serial port module, etc.). The Bluetooth circuitry 106, 108 can include one or more processors, volatile memory, non-volatile memory, sensors, clocks, antennas, transmitters, receivers and other components. In some examples, the Bluetooth circuitry is disposed on or inside of the first device 102 and/or second device 104. As such, the Bluetooth circuitry enables Bluetooth communication between the first and second devices 102, 104.

As shown in FIG. 1, the Bluetooth circuitry 106, 108 of the first and second devices 102, 104 includes an Access Address Engine 110, 112, respectively. As will be described in greater detail below, the Access Address Engine 110, 112 is used to generate a bit sequence, identify one or more candidate sequences from the generated sequence as potential Access Addresses, and identify which candidate sequences are to be representative of the Access Addresses.

As shown by the example of FIG. 1, the Bluetooth communication scheme can include a third device 114. In some examples, the third device 114 is exclusively connected to first device 102 via Bluetooth connection and does not connect to or communicate with the second device 104. In other examples, the third device 114 is exclusively in connection with the second device 104 and does not connect or communicate with the first device 102. In other examples, the third device 114 connects via Bluetooth to the first 102 and second 104 devices to form a network of Bluetooth connection.

As shown in FIG. 1, the third device 114 includes Bluetooth circuitry 116 to enable Bluetooth connection to the one or more devices. From the forgoing, the third device 114 can be a third type of Bluetooth device different than the first and second devices 102, 104 or can be the same as one or both of the first and second devices 102, 104.

As shown in FIG. 1, the third device 114 includes an Access Address Engine 118 for identification of one or more Access Addresses from generated sequences. The Access Address Engine 110, 112, and 118 of the first, second, and third devices 102, 104, and 114, respectively, is constructed to be substantially similar in each of the first, second, and third devices 102, 104, and 114.

In some examples, the first device 102 and second device 104 can be used to measure a round trip time (RTT) between the two devices connected via Bluetooth. As such, the RTT between the first device 102 and the second device 104 is a length of time needed for a data packet (e.g., a synchronization sequence) to be sent from the first device 102 to a first destination (e.g., the second device 104), in addition to the time needed for an acknowledgement of that packet to be sent back to the first device 102 (e.g., an originating destination). In some examples, the first device 102 in the RTT communication scheme is referred to as an initiator device to define the initial location of the synchronization sequence. In such examples, the second device 104 is referred to as a reflector device to define the device in which the synchronization sequence is reflected from and sent back to the initial location.

In the example of FIG. 1, the origin of communication is the first device 102, which sends a synchronization sequence to the second device 104 located a distance away from the first device 102 (e.g., 5 feet, 10 feet, etc.). Thus, the RTT for the Bluetooth communication scheme including the first and second device 102, 104 would be the time period for the first device 102 to send the synchronization sequence to the second device 104, the second device 104 to acknowledge the synchronization sequence and send a returning synchronization sequence back to the first device 102. In other examples, a different set of devices (e.g., the first device 102 and third device 114, the second device 104 and third device 114, etc.,) can be used for RTT determination.

Figure 2:
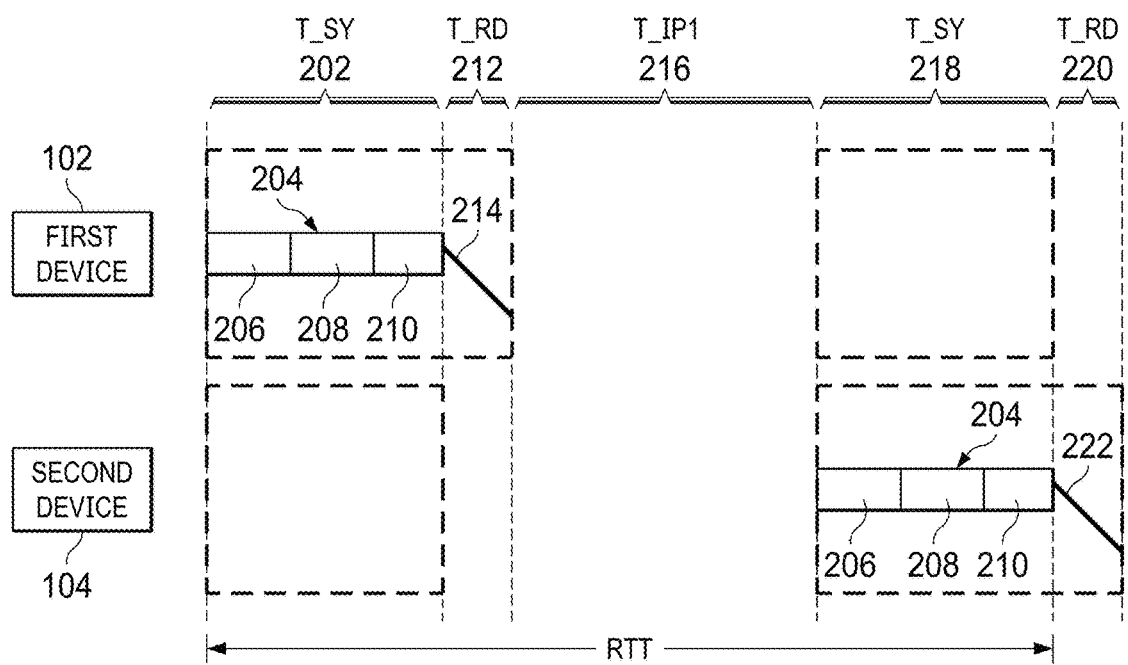
FIG. 2. is a diagram representing Bluetooth communication scheme between the first and second devices of FIG. 1.

FIG. 2. illustrates a conceptual diagram of a Bluetooth communication scheme between the first device 102 and second device 104 of FIG. 1. In some examples, the first and second devices 102, 104 are already in connection with each other via a Bluetooth connection. As shown in FIG. 2, during a first time interval 202, the first device 102 sends a first bit sequence 204 (e.g., a synchronization sequence) to the second device 104.

Disclosed herein are characteristics of synchronization sequences that can be used for RTT or for other purposes related to Bluetooth communication. As shown in FIG. 2, the example bit sequence 204 (e.g., synchronization sequence) sent by the first device 102 includes three bit portions and may be 52 bits in length. In other examples, the bit sequence 204 includes a different number of portions (e.g., one, two, four, etc.) and a different number of bits (e.g., 32, 64, etc.).

The example bit sequence 204 includes a preamble or leading bit sequence 206 that is 16 bits in length. In some examples, the preamble bit sequence 206 has a known bit pattern (e.g., an alternating 101010 . . . pattern) whereas in other examples the preamble bit sequence 206 is random.

In the example of FIG. 2, the bit sequence 204 includes a 32-bit synchronization sequence, also referred to herein as an Access Address (AA) 208, which follows the preamble bit sequence 206. In other examples, the Access Address 208 includes a different number of bits (e.g., 16, 52, etc.). As will be described in greater detail below, the content of the AA must be unpredictable, and each must be cryptographically generated.

In the example of FIG. 2, the bit sequence 204 also includes a 4-bit trailer or ending bit sequence 210, which follows the Access Address 208. The trailer sequence 210 has an alternating bit pattern (e.g., 1010, or 0101). In other examples, the trailer sequence 210 includes a random bit pattern. In other examples, the trailer bit sequence 210 has a different bit length.

As shown in FIG. 2, a second time interval 212 follows the first time interval 202 during which the bit sequence 204 is sent by the first device 102. During the second time interval 212, the first device 102 decreases, or ramps down power 214. In such instances, the first device 102 can enter a low-power mode or a hibernation mode, for example, to reduce power consumption during the RTT process. As shown in FIG. 2, a third time interval 216 or interlude period (e.g., a low power mode in one or more of the devices) follows the second time interval 212 during which the first device 102 ramps down power 214. The third time interval 216 can be longer or shorter than the total time of the first and second time intervals 202, 212.

After the third time interval 216 (e.g., the interlude period) the second device 104 in the Bluetooth communication scheme sends the bit sequence 204 (e.g., a synchronization sequence) back to the first device 102 during a fourth time interval 218. As shown in FIG. 2, the bit sequence 204 sent back to the first device 102 from the second device 104 includes the same three bit portions including the preamble bit sequence 206, the Access Address 208, and the trailer bit sequence 210. In other examples, the bit sequence sent back to the first device 102 from the second device 104 can be different (e.g., including a different preamble bit sequence, Access Address, and/or trailer bit sequence, etc.).

During a fifth time interval 220 occurring after the second device 104 send the bit sequence 204 back to the first device 102, the second device 104 decreases, or ramps down power 222. In such instances, the second device 104 can enter a low-power mode or a hibernation mode, for example, to reduce power consumption during the RTT process.

Once the second device 104 sends the bit sequence 204 back to the first device 102, RTT for the Bluetooth communication scheme between the pair of devices can be determined. As such, the summation of the first 202, second 212, third 216, and fourth 218 time intervals provides for the total RTT between the first and second devices 102, 104. In some examples, RTT can be determined for multiple scenarios, such as different frequencies or distances.

Figure 3:
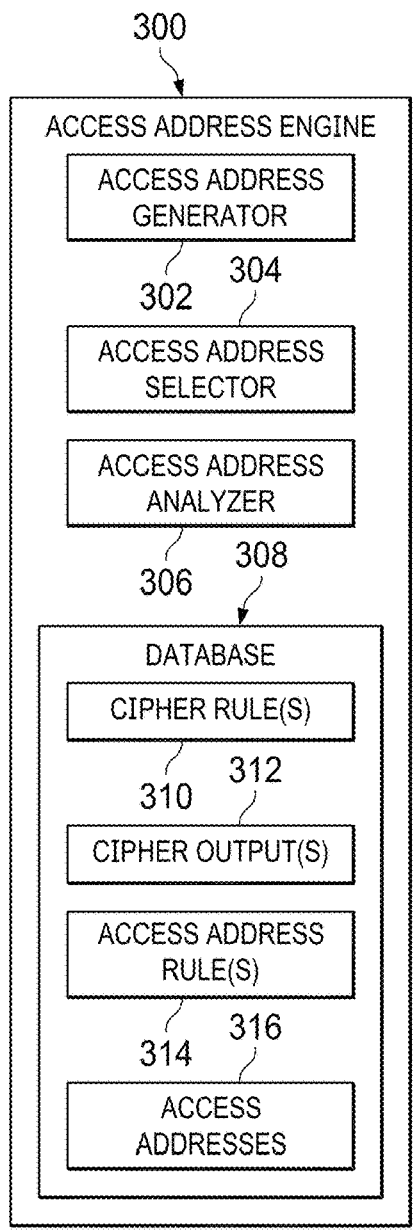
FIG. 3 is a block diagram of an example implementation of an example Bluetooth chip Access Address Engine.

FIG. 3 is a block diagram of an example Access Address Engine 300 constructed in accordance with the teachings disclosed herein. Returning to FIG. 1, the example Access Address Engine 300 can be coupled to or a part of the Bluetooth circuitry 106 of the first device 102. In some examples, the Access Address Engine 300 can be coupled to or a part of the Bluetooth circuitry 108, 116 of the second and third devices 104, 114, respectively. In other examples, the Access Address Engine 300 can be included in circuitry separate from the Bluetooth circuitry 106, 108, 116. As described herein, the Access Address Engine 300 includes an Access Address Generator 302, an Access Address Selector 304, an Access Address Analyzer 306, and a database 308. The database 308 of FIG. 3 includes one or more Cipher Rule(s) 310, Cipher Output(s) 312, Access Address Rule(s) 314 and Access Addresses 316. In some examples, the Access Address Engine 300 can include fewer or additional elements than those described herein. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The Advanced Encryption Standard (AES) is a specification used for encryption of electronic data and information. The AES encryption technique uses a block cipher (e.g., AES-128, AES-192, or AES-256) with a known or fixed number of bits in length (e.g., 128 bits corresponding to AES-128, etc.), known as a block, to encrypt and decrypt information of interest (e.g., a plain text). In doing so, the plain text undergoes a series of mathematical transformations with a known key (e.g., 128, 192, or 256 bits) to generate a new encrypted cipher data block of 128-bits. The AES-128 can be operated in various modes. In the examples disclosed herein, the AES-128 block cipher is operated in a counter mode (CTR) and uses a counter variable and an initialization vector. In other examples, the block cipher can be operated in other modes (e.g., Cipher FeedBack Mode, Cipher Block Chaining Mode, etc.). As such, the AES-128 block cipher generates a new encrypted unpredictable bit sequence, or an output, based on a 128-bit encryption key, an initialization vector, and the counter value. From the foregoing, it is understood that a given RTT communication scheme use a synchronization sequence, and thus, an Access Address. However, as will be discussed in greater detail below, multiple Access Addresses may be needed in Bluetooth communication scenarios.

In the example Access Address Engine 300 of FIG. 3, each Access Address (AA) bit sequence is cryptographically generated using an AES-128 block cipher in counter mode, referred to as AES-128 CTR hereinafter. The key (e.g., 128-bit key) is generated by and shared between the devices being paired (e.g., the first device 102, and second device 104, etc.,) during a measurement establishment phase in accordance with known Bluetooth communication specifications. In some examples, Access Address Engine 300 generates a common set of Access Addresses using the Access Address generation methods described in greater detail below. In some examples, the RTT Access Addresses are used for synchronization between two or more devices whereas in other examples the RTT AAs are used for security and round-trip time determination purposes.

As shown in the example of FIG. 3, the Access Address Engine 300 includes an Access Address Generator 302 to generate or output a 128-bit sequence (e.g., a binary vector) using a block cipher. The Access Address Generator 302 uses the AES-128, in counter mode (AES-128 CTR) as described above, to cryptographically generate an encrypted 128-bit output sequence. As such, the Access Address Generator 302 provides a means to cryptographically generate a first bit sequence. In other examples, the Access Address Generator 302 uses an alternate algorithm or block cipher or alternate cipher operation mode to cryptographically generate the 128-bit sequence.

In some examples, the Access Address Generator 302 brings together a number, B, of 128-bit blocks to determine the Access Addresses. As described above, since each of the B blocks is 128 bits in size, the total number of bits in the particular block union is thereby, B*128. As disclosed herein, since each AA is 32 bits in length, a formula, (B*128)/32, which simplified to 4*B, can be used to determine a total number of possible AAs given a known number of 128-bit blocks. The total number of AAs needed for a particular Bluetooth communication scheme between a first and second device 102, 104 can be defined as N. As such, the Access Address Generator 302 runs, or iterates the AES-128 CTR cipher block N*B times to generate the N needed AAs. It is understood that the variables are denoted arbitrarily and can be denoted differently in other examples.

In some examples, each time the Access Address Generator 302 iterates through the AES-128 CTR, an output bit sequence, $y_i$, 128-bits in length is generated based on the 128-bit key, k, that is shared between the first device 102 and second device 104, an initialization vector, IV, determined by the first and second devices 102, 104, and a counter value, $CTR_i$, where the index i begins at zero. In some examples, the counter value, $CTR_i$, is an arbitrary index value to denote the number of times the AES-128 CTR is called or run by the Access Address Generator 302 and can begin at a number different than zero. In this example, the counter value, $CTR_i$ begins at 0 and increments by 1 ($CTR_i+1$) each time the AES-128 CTR is called or run by the Access Address Generator 302.

For example, if the Access Address Generator 302 uses only one 128-bit block (B=1) by the AES-128 CTR to identify the AAs, based on equation 4*B, there are 4 potential Access Addresses that can be determined. In this example, if two AAs are to be determined for a given Bluetooth connection scenario, the Access Address Generator 302 iterates twice ($CTR_i=2$) or N*B times to generate the encrypted 128-bit output sequence of the AES-128 CTR. In other examples, the AES-128 CTR is called by the Access Address Generator 302 a different number of times (e.g., four, sixteen, etc.) based on the number of AAs needed for the Bluetooth connection scenario and the number of 128-bit blocks used.

In some examples, each time the Access Address Generator 302 calls the AES-128 CTR the determined number of N*B iterations (e.g., two, four, eight, etc.) based on the number of blocks, B, and required synchronization sequences, N, the Access Address Generator 302 concatenates the generated 128-bit sequence output, $y_i$, with the previously generated 128-bit sequences output into a single vector to generate the final output of the AES-128 CTR, Y(N) (e.g., a vector). For example, if three (B=3) 128-bit blocks were brought together by the Access Address Generator 302 to determine four AAs, the final output of the AES-128 CTR, Y(N), would be a concatenation of three encrypted 128-bit sequences. In other examples, the Access Address Generator 302 concatenates each $y_i$ output after the AES-128 CTR is called for the total number of N*B iterations rather than after each iteration.

In some examples, the Access Address Generator 302 checks if the AES-128 CTR has iterated through all N*B iterations. As such, the Access Address Generator 302 determines if the total number of output sequences for determining the desired number of AAs has been obtained or if another output sequence must be generated by the AES-128 CTR. For example, if the total number of iterations of the AES-128 CTR is two, and the Access Address Generator 302 determines that the AES-128 CTR has run twice, thus fulfilling the number of iterations, the Access Address Generator 302 will refrain for running the AES-128 CTR another time to generate another output sequence. However, if the Access Address Generator 302 determines that the AES-128 CTR has not run for the number of required times, the Access Address Generator 302 will continue to call the AES-128 CTR to generate another, $y_i$, output sequence. Thus, the final output sequence is generated based on a determined quantity of iterations.

As shown in FIG. 3, the Access Address Engine 300 includes a database 308. The database 308 stores data related to the Cipher Rule(s) 310 such as the shared key, k, initialization vector, IV, the counter variable, $CTR_i$, the number of 128-bit blocks used to determine the AAs, B, the number of AAs to be determined for a given Bluetooth connection scenario, N, the number of iterations the AES-128 CTR is to be run by the Access Address Generator 302, N*B, etc. As shown by FIG. 3, the Cipher Output(s) 312 (e.g., sequences) generated by the AES-128 CTR are also stored in the database 308.

In some examples, after the Access Address Generator 302 iterates N*B times through the AES-128 CTR to generate the concatenated bit sequence output, Y(N), the Access Address Selector 304 indexes each bit of the final concatenated bit sequence output, Y(N). In some examples when the total number of bits in the final output sequence is 128, the Access Address Selector 304 indexes each bit beginning with 0 to 127. In other examples, the bits of the output vector are indexed differently. After indexing the final output sequence, the Access Address Selector 304 divides the output sequence, into 4*B total number of sequences. For example, if the 4*B total number of sequences is four, the final output sequence is divided into four sequences containing 32 bits each. In other examples, the Access Address Selector 304 reads a number of bits (e.g., 32 bits, etc.) from the output sequence rather than dividing the output sequences into shorter sequences.

For example, a first bit sequence can be denoted as s0, a second bit sequence can be denoted as s1, a third bit sequence can be denoted as s2, and a fourth bit sequence can be denoted as s3. In other examples, each sequence can be denoted with a different indicator. As such, the Access Address Selector 304 selects bits indexed at 0 to 31 of output sequence Y(N) for sequence 0 ($s_0$), bits indexed at 32 to 63 of output sequence Y(N) for sequence 1 ($s_1$), bits indexed at 64 to 95 of output sequence Y(N) for sequence 2 ($s_2$), and bits indexed at 96 to 127 of output sequence Y(N) for sequence 3 ($s_3$). In other examples, the Access Address Selector 304 divides or reads the output Y(N), into a different number of sequences (e.g., five, 10, etc.,), each containing a different number of bits (e.g., 16, 56, etc.).

In the examples disclosed herein, the Access Address Selector 304 uses the divided sequences $s_0$-$s_3$ to determine a pair of AAs for the Bluetooth communication scheme. For example, the Access Address Selector 304 selects the first and second divided sequences, $s_0$ and $s_1$ to determine the 32-bit sequence representative of a first Access Address (AA0), and the third and fourth divided sequences, $s_2$ and $s_3$ to determine the 32-bit sequence representative of a second Access Address (AA1). In other examples, the Access Address Selector 304 selects different sequences to determine each Access Address. In some examples, the Access Address Selector 304 reads 4*B portions of the final output sequence and thus provides a means to read one or more portions (e.g., a first portion, a second portion, a third portion, etc.) of the output sequence.

As shown by FIG. 3, the Access Address Engine 300 includes an Access Address Analyzer 306 to analyze each divided or read sequence of the output sequence of the AES-128 CTR to determine identify which of the divided sequences is to be representative of the first and second Access Address for the given Bluetooth communication scheme. For example, the Access Address Analyzer 306 applies one or more Access Address Rule(s) 314 to each of the divided sequences (e.g., $s_0$, $s_1$, $s_2$, $s_3$) to identify a sequence to become the first or second Access Address. As such, the Access Address Analyzer 306 provides a means to identify one or more Access Addresses from the divided portions based on one or more rules.

In some examples, the Access Address Rule(s) 314 (e.g., Access Address Selection Rules, etc.) is based on a selection function with respect to a binary autocorrelation function and an energy score value, for example, as described in greater detail below. In some examples, the Access Address Analyzer 306 applies the following binary autocorrelation function of EQ. 1 on each of the divided sequences (e.g., $s_0$, $s_1$, $s_2$, $s_3$) where s is the binary sequence (e.g., $s_0$, $s_1$, $s_2$, $s_3$) of length N (e.g., 32 bits), comprised of N elements that are either 0 or 1 value, and k is in the 1 to N range, and where Ck is not computed for k=0:

$$C(k) = \left(\frac{-1}{N}\right) + \sum_{i=1}^{N-k} s_i \oplus s_{i+k} \qquad \text{EQ. 1}$$

As seen by the above binary autocorrelation function of EQ. 1, the $\oplus$ represents a binary x or operation. Thus, the C(k) function represents a comparison of sequence s (e.g., $s_0$, $s_1$, $s_2$, $s_3$) with a k-bit shifted version of the sequence by 1 bit (e.g., bit k+1 compared with bit 1, etc.).

In some examples, the Access Address Analyzer 306 then determines an energy score value, E, of the binary autocorrelation function based on the following equation, where E indicates the average energy of the values of the binary autocorrelation function.

$$E = \sum_{k=1}^{N} C(k)^2 \qquad \text{EQ.2}$$

In determining a value for E, a lower numerical score is indicative of a desirable outcome as lower E values signify a better autocorrelation property.

As such, the Access Address Analyzer 306 applies the Access Address Rule(s) 314 to determine the energy score value for each sequence using EQ. 2 (e.g., $s_0$, $s_1$, $s_2$, $s_3$) based on the applied binary autocorrelation function of EQ. 1. The Access Address Analyzer 306 then performs a comparison between the energy score values corresponding to the two sequences determined to be representative of each Access Address (e.g., AA0, AA1). For example, the Access Address Analyzer 306 compares the energy score value corresponding to each divided sequence determined by the Access Address Selector 304 to be used for the first Access Address, $s_0$ and $s_1$. In performing the comparison, the Access Address Analyzer 306 selects sequence $s_0$ or $s_1$ to be the sequence representative of the first Access Address based on which sequence has a lower energy score value, E. The Access Address Analyzer 306 repeats the comparison for the energy score values corresponding to the sequences determined to be used for the second Access Address, $s_2$, and $s_3$, for example. Thus, the Access Address Analyzer 306 provides a means to identify one or more Access Addresses (e.g., AA0, AA1, etc.) based on energy score values where the energy score values are a function of the applied binary autocorrelation function.

As shown by FIG. 3, the determined Access Addresses 316 are stored in the database 308 for use. In some examples, the database 308 can also store the sequences that were not selected to be representative of the Access Addresses. In other examples, the Access Address Engine 300 discards the sequences that were not selected to be representative of the Access Addresses for the given Bluetooth communication scheme.

In some examples, the described Access Address Rule(s) 314 apply to 32-bit sequences. However, in other examples, additional or other rules not described herein may be used to identify a sequence as the Access Address between two or more candidate sequences (e.g., $s_0$, $s_1$, $s_2$, $s_3$) that have an alternate number of bits (e.g., 16, 52, etc.).

Figure 4:
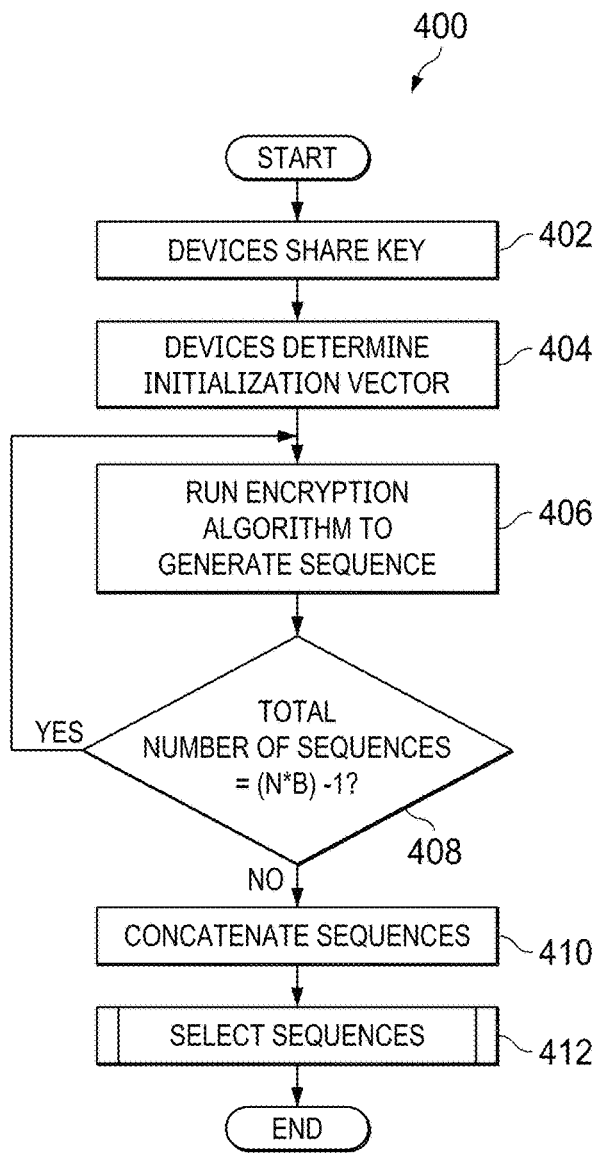
FIG. 4 is a flowchart representative of machine readable instructions which may be executed to implement the Access Address Generator of FIG. 3.

A flowchart representative of example hardware logic, machine readable instructions, hardware implemented state machines, and/or any combination thereof for implementing the Access Address Generator 302 of FIG. 3 is shown in FIG. 4. The machine-readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 4, many other methods of implementing the example Access Address Generator 302 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The process 400 begins at block 402 where the synchronizing devices in the Bluetooth communication scheme share a 128-bit key. At block 404, both devices in the Bluetooth communication scheme determine an initialization vector for use with the encryption algorithm. The process proceeds to block 406, where the Access Address Generator 302 runs the encryption algorithm, AES-128 CTR, using the shared key, initialization vector, a counter variable initialized at zero, a number of 128-bit blocks, and a number of desired synchronization sequences to generate a sequence. At block 406, the Access Address Generator 302 determines if the total number of sequences generated by the encryption algorithm is one less than N*B (total number of desired AAs for the number of bit blocks used). If the number of generated sequences is one less than N*B, the process returns to block 406 where the Access Address Generator 302 runs the AES-128 encryption algorithm another time to generate another bit sequence. However, if at block 408, the Access Address Generator 302 determines that the total number of bit sequences generated not one less than N*B, or the AES-128 CTR has iterated the full N*B times, the process proceeds to block 410.

At block 410, the Access Address Generator 302 concatenates the output sequences for the number of B blocks used to determine the Access Addresses. For example, if B=2, and two 128-bit blocks are used by the AES-128 CTR algorithm, to generate the 8 (4*B) candidate sequences for determination of Access Addresses, the Access Address Generator 302 would concatenate the two generated output sequences to determine the final output sequence Y(N). However, if only one 128-bit block (B=1) is used to determine the Access Address candidates, the process skips block 410, as only one 128-bit out sequence will be generated by the AES-128 algorithm. At block 412, the Access Address Selector 304, selects a number of bit sequences (e.g., two 32-bit sequences) for analysis by the Access Address Analyzer 306.

Figure 5:
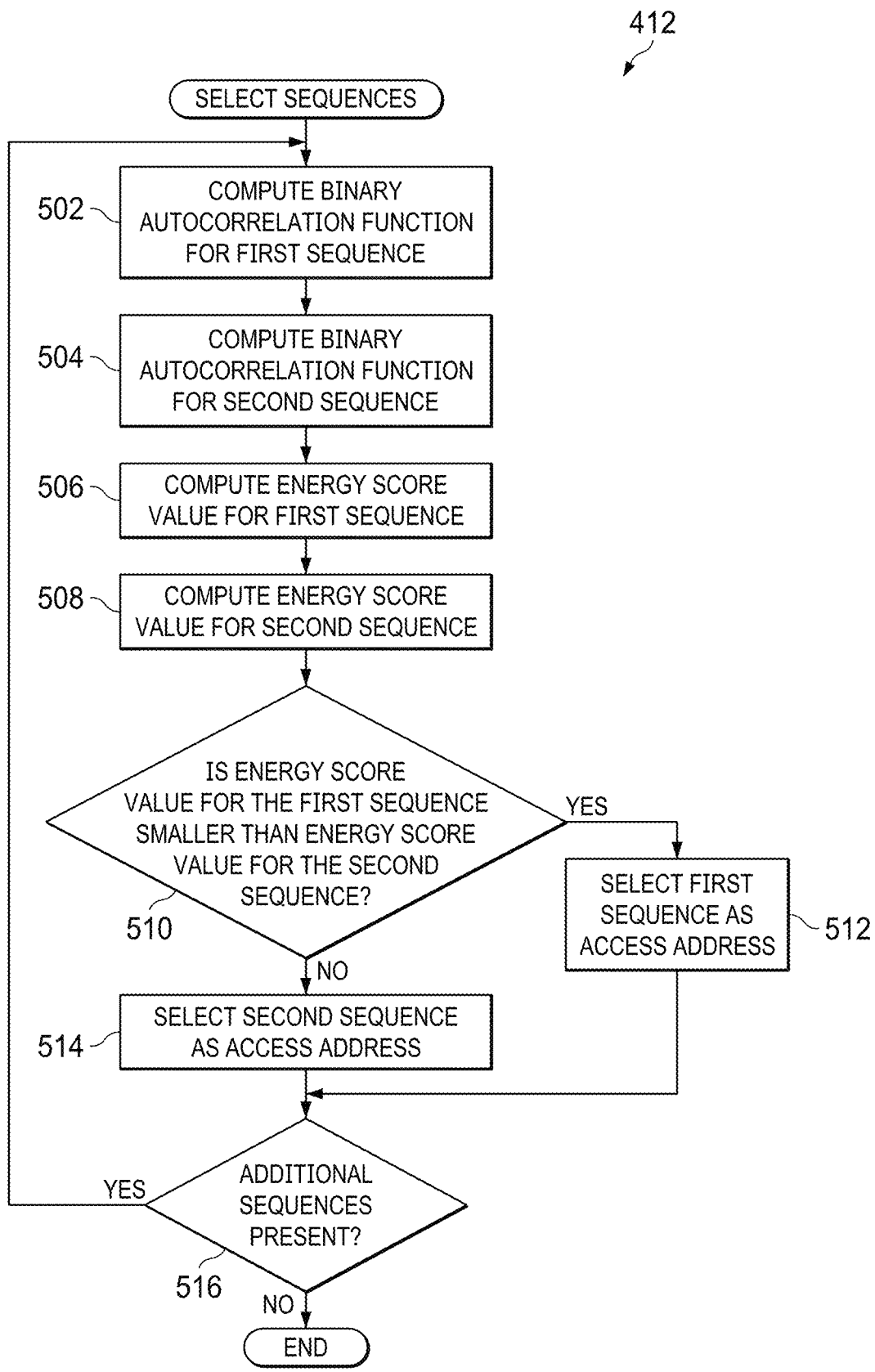
FIG. 5 is a flowchart representative of machine readable instructions which may be executed to implement the Access Address Analyzer of FIG. 3.

A flowchart representative of example hardware logic, machine readable instructions, hardware implemented state machines, and/or any combination thereof for implementing the Access Address Analyzer 306 of FIG. 3 is shown in FIG. 5. The process is a subprocess of block 412 of process 400. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 4, many other methods of implementing the example Access Address Analyzer 306 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The process begins at block 412 where the Access Address Selector 304 selects candidate sequences (e.g., $s_0$ and $s_1$) for determination of an Access Address between the candidate sequences. The process 412 proceeds to block 502 where the Access Address Analyzer 306 computes a binary autocorrelation correlation function for the first candidate sequence (e.g., $s_0$). At block 504, the Access Address Analyzer 306 computes a binary autocorrelation function for the second candidate sequence (e.g., $s_0$). The process proceeds to block 506 where the Access Address Analyzer 306 computes an energy score value for the first candidate sequence (e.g., $s_0$) based on the binary autocorrelation function result determined at block 502 and proceeds to block 508. At block 508 the Access Address Analyzer 306 computes a second energy score value for the second candidate sequence (e.g., $s_1$) from the binary autocorrelation result determined at block 504.

The process 412 proceeds to block 510, where the Access Address Analyzer 306 determines if the energy score value corresponding to the first candidate sequence determined at block 506 is smaller than the value of the energy score value corresponding to the second candidate sequence determined at block 508. If the energy score value corresponding to the first candidate sequence is smaller than the second energy score value corresponding to the second candidate sequence, the Access Address Analyzer 306 selects the first candidate sequence as the sequence representative of the Access Address at block 512. Otherwise, at block 514, if the first energy score value corresponding to the first candidate sequence is not smaller than the second energy score value corresponding to the second candidate sequence, the Access Address Analyzer 306 selects the second candidate sequence as the sequence representative of the Access Address.

After an Access Address is determined based on the first or second candidate sequence, process 412 proceeds to block 516 where the Access Address Analyzer 306 determines if additional candidate sequences are present for analysis. For example, the additional candidate sequences may determine another or additional Access Addresses for the given Bluetooth communication scheme. If at block 516 additional sequences are present that a binary autocorrelation function has not been determined for, the process proceeds to block 412 where the Access Address Selector 304 selects the sequences. Otherwise, at 516 if no other sequences are identified for analysis, the process ends.

Figure 6:
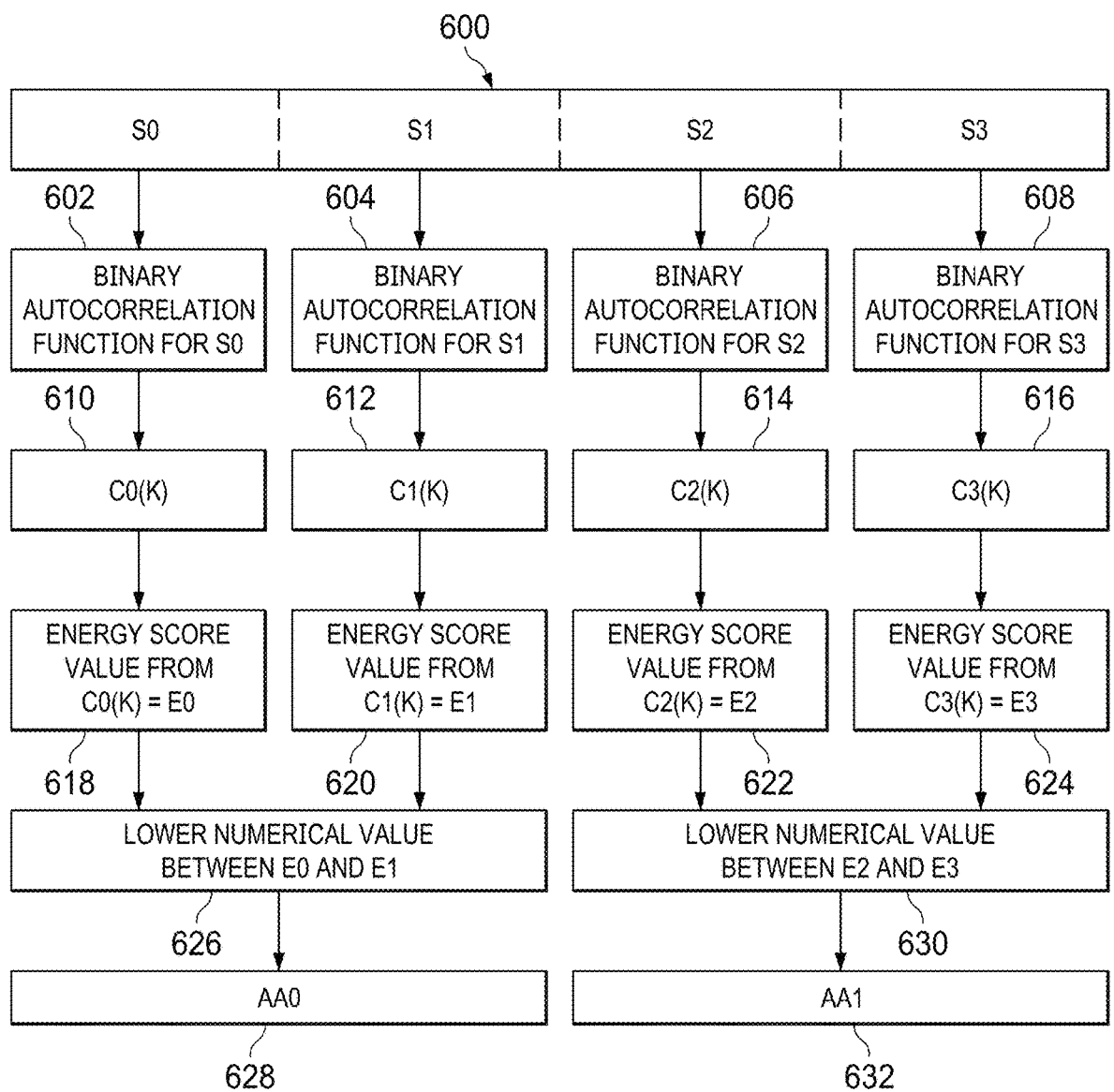
FIG. 6 is a diagram representing operation of the example Access Address Engine of FIG. 3

FIG. 6. is a diagram representing operation of forming Access Addresses as carried out by the Access Address Engine 300 of FIG. 3. As shown in FIG. 6, the Access Address Generator 302 provides a means for cryptographically generating an encrypted output bit sequence 600 based on a block cipher algorithm (e.g., AES-128 CTR, etc.,). The Access Address Selector 304 divides the output sequence 600 into a number (e.g., 4*B, etc.,) of bit sequences (e.g., $s_0$, $s_1$, $s_2$, and $s_3$). In other examples, the Access Address Selector 304 reads a number of (e.g., 4*B, etc.,) portions of the output sequence 600. The bit sequences define the candidate bit sequences from which the Access Address Analyzer 306 determines one or more Access Addresses. For example, if the output sequence 600 includes 128-bits, the Access Address Selector 304 divides the output sequence 600 into sequences $s_0$, $s_1$, $s_2$, and $s_3$ containing 32 bits, respectively.

The Access Address Analyzer 306 determines a binary autocorrelation function for each candidate sequence $s_0$-$s_3$ 602, 604, 606, and 608, respectively. As such, the Access Address Analyzer 306 determines a binary autocorrelation result for each candidate sequence $s_0$-$s_3$ 610, 612, 614, and 616 respectively. The Access Address Analyzer 306 determines an energy score value (e.g., E0, E1, E2, and E3) for each candidate sequence $s_0$-$s_3$ 618, 620, 622, and 624 respectively based on the results of the binary autocorrelation function of each candidate sequence 610, 612, 614, and 616.

As the Access Address Selector 304 selected sequences $s_0$ and $s_1$ as candidate sequences for the determination of the first Access Address (e.g., AA0), the Access Address Analyzer 306 compares the energy score values E0 and E1 corresponding to the selected candidate sequences to identify which energy score value is lower 626. The candidate sequence with the lower energy score value at 626 is selected by the Access Address Analyzer 306 to be the first Access Address 628.

As the Access Address Selector 304 selected sequences $s_2$ and $s_3$ as candidate sequences for the determination of the second Access Address (e.g., AA1), the Access Address Analyzer 306 compares the energy score values E2 and E3 corresponding to the selected candidate sequences to identify which energy score value is lower 630. The candidate sequence with the lower energy score value at 630 is selected by the Access Address Analyzer 306 to be the first Access Address 632.

While an example manner of implementing the Access Address Engine 300 as illustrated in FIG. 3, one or more of the elements, processes and/or devices illustrated in FIG. 3 may be combined, divided, re-arranged, omitted, eliminated and/or implemented in any other way. Further, the example Access Address Generator 302, the example Access Address Selector 304, and the example Access address Analyzer 306, and/or, more generally, the example Access Address Engine 300 of FIG. 3 may be implemented by hardware, software, firmware and/or any combination of hardware, software and/or firmware. Thus, for example, any of the example Access Address Generator 302, the example Access Address Selector 304, and the example Access address Analyzer 306 and/or, more generally, the example Access Address Engine 300 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, Access Address Generator 302, Access Address Selector 304, and Access address Analyzer 306 is/are hereby expressly defined to include a non-transitory computer readable storage device or storage disk such as a memory, a digital versatile disk (DVD), a compact disk (CD), a Blu-ray disk, etc. including the software and/or firmware. Further still, the example Access Address Engine 300 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 7:
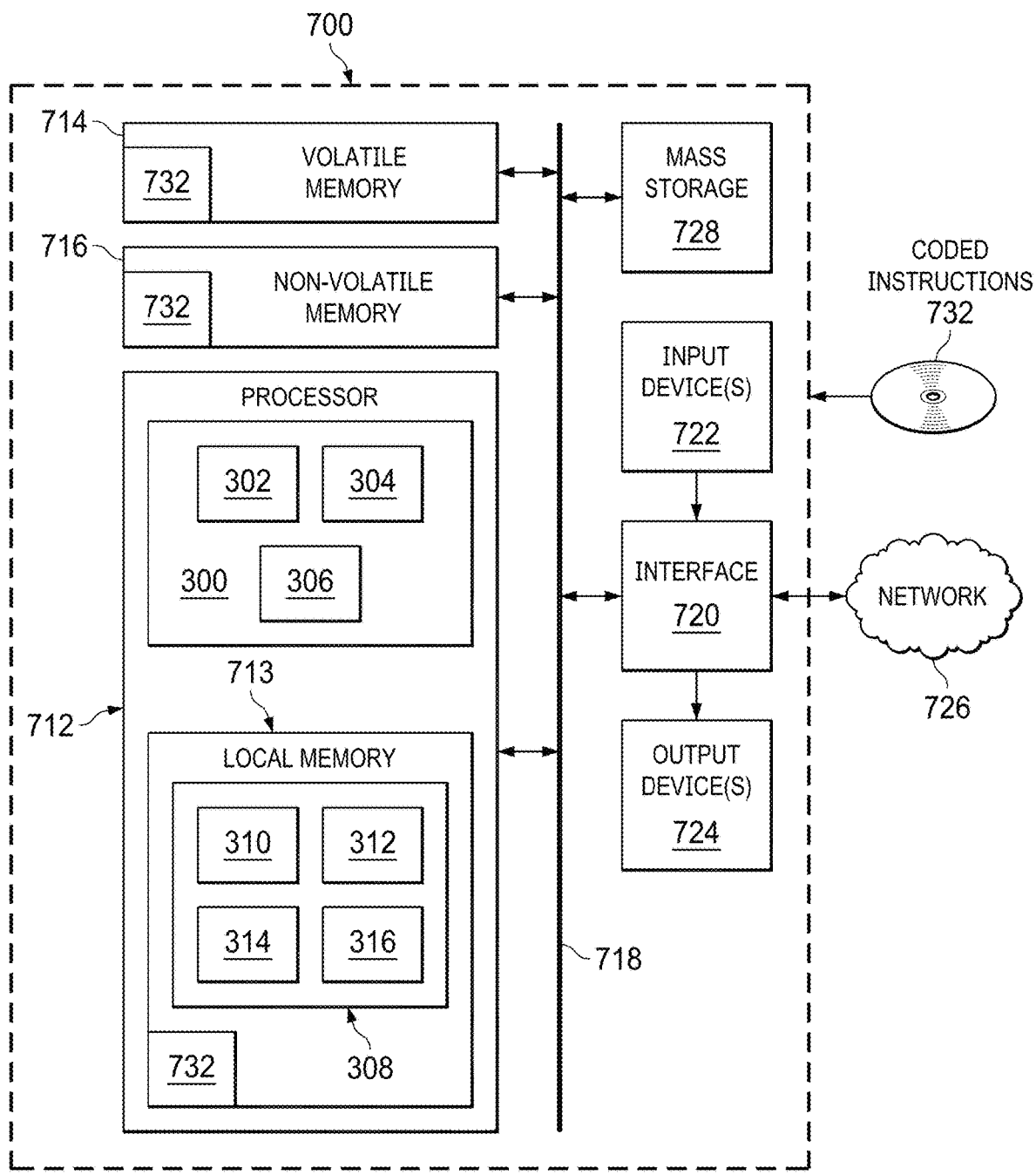
FIG. 7 is a block diagram of an example processing platform structured to execute the instructions of FIGS. 4-5 to implement the example Access Address Engine of FIG. 3.

FIG. 7 is a block diagram of an example processor platform 700 structured to execute the instructions of FIGS. 4-5 to implement the apparatus of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the Access Address Generator 302, Access Address Selector 304, and Access Address Analyzer 306.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 4-5 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that generate synchronization sequences (e.g., Access Addresses) that are (1) cryptographically generated, independently at both devices, from a shared key, (2) used as a synchronization input for a receiver, and (3) are similar (e.g., identical) under all circumstances. The disclosed methods, apparatus and articles of manufacture improve the efficiency of using a computing device or Bluetooth circuitry by generating multiple synchronization sequences (e.g., Access Addresses) to enable Bluetooth communication and connection between two or more devices when more than one synchronization sequence is needed for a given Bluetooth communication scheme. The disclosed methods, apparatus and articles of manufacture are accordingly directed to one or more improvement(s) in the functioning of a computer such as cryptographically generating a secure synchronization sequence that is unpredictable and identical in outcome under most circumstances.

Example methods, systems, apparatus, to synchronize devices have been disclosed herein. The following paragraphs provide various examples and example combinations of the examples disclosed herein.

Example 1 is an apparatus including an access address generator to cryptographically generate a first bit sequence, an access address selector to read a first portion of the first bit sequence, and read a second portion of the first bit sequence, the second portion different than the first portion, and an access address analyzer to identify a first access address from the first portion based on a first criteria, wherein the first criteria is a function of a first autocorrelation function, and identify a second access address from the second portion based on a second criteria, wherein the second criteria is a function of a second autocorrelation function.

Example 2 includes the apparatus of Example 1, wherein first bit sequence is generated based on a first quantity of iterations.

Example 3 includes the apparatus of Example 2, wherein the first quantity of iterations is based on a number of access addresses and a number of bit blocks used to generate the first bit sequence.

Example 4 includes the apparatus of Examples 1-3, wherein the first bit sequence is 128 bits in length.

Example 5 includes the apparatus of Examples 1-4, wherein to cryptographically generate the first bit sequence includes a block cipher.

Example 6 includes the apparatus of Examples 1-5, wherein the block cipher is based on a key, an initialization vector, and a counter variable.

Example 7 includes the apparatus of Examples 1-6, wherein the first and second criteria are a first and second energy score value.

Example 8 includes the apparatus of Examples 1-7, wherein the first and second access addresses are 32 bits in length.

Example 9 is a non-transitory computer readable media including instructions, which, when executed by one or more processors cause the one or more processors to cryptographically generate a first bit sequence, read a first portion of the first bit sequence, read a second portion of the first bit sequence, the second portion different than the first portion, identify a first access address from the first portion based on a first criteria, wherein the first criteria is a function of a first autocorrelation function, and identify a second access address from the second portion based on a second criteria, wherein the second criteria is a function of a second autocorrelation function.

Example 10 includes the instructions of Example 9, wherein first bit sequence is generated based on a first quantity of iterations.

Example 11 includes the instructions of Example 10, wherein the first quantity of iterations is based on a number of access addresses and a number of bit blocks used to generate the first bit sequence.

Example 12 includes the instructions of Examples 9-11, wherein the first bit sequence is 128 bits in length.

Example 13 includes the instructions of Examples 9-12, wherein to cryptographically generate the first bit sequence includes a block cipher.

Example 14 includes the instructions of Examples 9-13, wherein the block cipher is based on a key, an initialization vector, and a counter variable.

Example 15 includes the instructions of Examples 9-14, wherein the first and second criteria are a first and second energy score value.

Example 16 includes the instructions of Examples 9-15, wherein the first and second access addresses are 32 bits in length.

Example 17 is a method including cryptographically generating a first bit sequence, reading a first portion of the first bit sequence, reading a second portion of the first bit sequence, the second portion different than the first portion, identifying a first access address from the first portion based on a first criteria, wherein the first criteria is a function of a first autocorrelation function, and identifying a second access address from the second portion based on a second criteria, wherein the second criteria is a function of a second autocorrelation function.

Example 18 includes the method of Example 17, wherein first bit sequence is generated based on a first quantity of iterations.

Example 19 includes the method of Example 18, wherein the first quantity of iterations is based on a number of access addresses and a number of bit blocks used to generate the first bit sequence.

Example 20 includes the method of Examples 17-19, wherein the first bit sequence is 128 bits in length.

Example 21 includes the method of Examples 17-20, wherein to cryptographically generate the first bit sequence includes a block cipher.

Example 22 includes the method of Examples 17-21 wherein the block cipher is based on a key, an initialization vector, and a counter variable.

Example 23 includes the method of Examples 17-22, wherein the first and second criteria are a first and second energy score value.

Example 24 includes the method of Examples 17-23, wherein the first and second access addresses are 32 bits in length.

Example 25 is an apparatus including means to cryptographically generate a first bit sequence, means to read a first portion of the first bit sequence, and read a second portion of the first bit sequence, the second portion different than the first portion, and means to identify a first access address from the first portion based on a first criteria, wherein the first criteria is a function of a first autocorrelation function, and identify a second access address from the second portion based on a second criteria, wherein the second criteria is a function of a second autocorrelation function.

Example 26 includes the apparatus of Example 25, wherein first bit sequence is generated based on a first quantity of iterations.

Example 27 includes the apparatus of Examples 25-26, wherein the first quantity of iterations is based on a number of access addresses and a number of bit blocks used to generate the first bit sequence.

Example 28 includes the apparatus of Examples 25-27, wherein the first bit sequence is 128 bits in length.

Example 29 includes the apparatus of Examples 25-28, wherein to cryptographically generate the first bit sequence includes a block cipher.

Example 30 includes the apparatus of Examples 25-29, wherein the block cipher is based on a key, an initialization vector, and a counter variable.

Example 31 includes the apparatus of Examples 25-30, wherein the first and second criteria are a first and second energy score value.

Example 32 includes the apparatus of Example 25-31, wherein the first and second access addresses are 32 bits in length.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An electronic device comprising:
   a transceiver configurable to communicate using wireless communication; and
   a processor configurable to:
   obtain a bit sequence having a first portion, a second portion, a third portion, and a fourth portion, determine first, second, third, and fourth energies of the first, second, third, and fourth portions of the bit sequence, respectively, select as a first access address a portion of the bit sequence corresponding to a lower energy between the first and second energies, select as a second access address a portion of the bit sequence corresponding to a lower energy between the third and fourth energies, and use the first access address and the second access address for the wireless communication via the transceiver.

2. The electronic device of claim 1, wherein the processor is configurable to calculate the first energy using a binary autocorrelation function.

3. The electronic device of claim 1, wherein the obtaining the bit sequence comprises generating the bit sequence.

4. The electronic device of claim 3, wherein generating the bit sequence comprises cryptographically generating the bit sequence.

5. The electronic device of claim 4, wherein cryptographically generating the bit sequence comprises using an Advanced Encryption Standard (AES).

6. The electronic device of claim 4, wherein cryptographically generating the bit sequence comprises operating a block cypher in counter mode.

7. The electronic device of claim 3, wherein the processor is configurable to generate the bit sequence based on a shared key.

8. The electronic device of claim 7, wherein the shared key is shared between the electronic device and a wireless device, and wherein communicating using the wireless communication comprises communicating with the wireless device.

9. The electronic device of claim 8, the first access address is part of a longer synchronization sequence used between the electronic device and the wireless device to facilitate secure syncing and connection.

10. The electronic device of claim 3, wherein the processor is configurable to iterate Q times over a generation algorithm to generate corresponding Q sequences, Q being a positive integer greater than 1, wherein the bit sequence is based on the Q sequences.

11. The electronic device of claim 10, wherein the processor is configurable to concatenate the Q sequences, and wherein the bit sequence is equal to the concatenated Q sequences.

12. The electronic device of claim 10, wherein the bit sequence consists of the first, second, third, and fourth portions.

13. The electronic device of claim 1, wherein each of the first and second access addresses is 32 bits in length.

14. The electronic device of claim 1, wherein each of the first and second access addresses is balanced in terms of the 0s (zeros) and 1s (ones).

15. The electronic device of claim 1, wherein communicating using the wireless communication comprises communicating using Bluetooth Low Energy (BLE).

16. The electronic device of claim 1, wherein communicating using the wireless communication comprises using the first access address to determine a round trip time (RTT) with a wireless device.

17. The electronic device of claim 1, wherein using the first access address and the second access address for the wireless communication comprises using the first access address to communicate with a first wireless device, and using the second access address to communicate with a second wireless device.

18. The electronic device of claim 1, wherein communicating using the wireless communication comprises transmitting a packet that comprises a preamble, the first access address, and a trailer.

19. The electronic device of claim 18, wherein the preamble is 16 bits in length, and the trailer is 4 bits in length.

20. The electronic device of claim 18, wherein the preamble has an alternating bit pattern, and the trailer has an alternating bit pattern.

21. The electronic device of claim 18, wherein the preamble or the trailer has a random bit pattern.

* * * * *